(12) United States Patent
Chu et al.

(10) Patent No.: US 11,800,445 B2
(45) Date of Patent: Oct. 24, 2023

(54) FRAME TRANSMISSION BETWEEN WIRELESS DEVICES

(71) Applicant: NXP USA, INC., Austin, TX (US)

(72) Inventors: Liwen Chu, San Ramon, CA (US); Young Hoon Kwon, Laguna Niguel, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 83 days.

(21) Appl. No.: 17/492,192

(22) Filed: Oct. 1, 2021

(65) Prior Publication Data

US 2022/0110053 A1 Apr. 7, 2022

Related U.S. Application Data

(60) Provisional application No. 63/160,449, filed on Mar. 12, 2021, provisional application No. 63/140,765, (Continued)

(51) Int. Cl.
*H04W 52/02* (2009.01)
*H04W 28/02* (2009.01)
*H04W 74/04* (2009.01)

(52) U.S. Cl.
CPC ... *H04W 52/0216* (2013.01); *H04W 28/0278* (2013.01); *H04W 74/04* (2013.01)

(58) Field of Classification Search
None
See application file for complete search history.

(56) References Cited

U.S. PATENT DOCUMENTS 9,014,105 B2 4/2015 Chu et al.
2017/0265130 A1* 9/2017 Kakani ................ H04W 48/10
(Continued)

FOREIGN PATENT DOCUMENTS

| WO | WO2022051311 | * | 3/2022 |
| WO | WO2022094297 | * | 5/2022 |
| WO | WO2022132030 | * | 6/2022 |

OTHER PUBLICATIONS

Subir Das, Perspecta Labs. "Priority Access Support in IEEE 802.11be: What and Why?" doc : IEEE 802.11-19/19014r dated Nov. 10, 2019; 19 pgs.

(Continued)

*Primary Examiner* — Andre Tacdiran

(57) ABSTRACT

Aspects of the present disclosure are directed to wireless communications based on a restricted TWT SP and buffer status. As may be implemented in accordance with one or more embodiments, frames are transmitted based on a restricted TWT SP and buffer status for communications between wireless circuits. Control data for the communications traffic may be processed in response to the restricted TWT SP, with a TXOP ending at the beginning of a restricted TWT SP of a another link, in response to the restricted TWT SP being negotiated in a different link. Such an approach may be carried out where one of the wireless circuits has no STR configuration. A protected duration time for the TWT SP may be set to a time that is less than a duration of the TWT SP in response to the TWT SP being protected by a quiet element duration period.

20 Claims, 3 Drawing Sheets

Related U.S. Application Data filed on Jan. 22, 2021, provisional application No. 63/086,166, filed on Oct. 1, 2020.

(56) References Cited

U.S. PATENT DOCUMENTS

2019/0158385 A1\* 5/2019 Patil .................... H04W 24/08
2021/0212156 A1   7/2021 Kwon et al.
2021/0360646 A1   11/2021 Chu et al.

OTHER PUBLICATIONS

U.S. Appl. No. 17/181,904, filed Feb. 22, 2021. The Examiner is referred to the copending patent prosecution of the common Applicant (No Attachment).

\* cited by examiner

FRAME TRANSMISSION BETWEEN WIRELESS DEVICES

OVERVIEW

Aspects of various embodiments are directed to various approaches to frame transmission between wireless devices.

Various communications involve transmitting data between devices over one or multiple channels using communication protocols that direct characteristics of the communications. For single-channel communications, use of the channel can be challenging to manage when multiple devices may utilize the single channel. For multi-channel communications, coordination of communications on respective channels can also be challenging, for example to ensure devices can properly receive data communicated on the channel. For instance, frame transmission rules in IEEE 802.11ax (baseline) may provide less than desirable quality of service (QoS) support.

These and other matters have presented challenges to efficiencies of wireless communication systems, apparatuses and implementations, for a variety of applications.

SUMMARY

Various example embodiments are directed to issues such as those addressed above and/or others which may become apparent from the following disclosure concerning wireless communications and related signaling with respect to channel usage by respective wireless devices/circuitry.

In certain example embodiments, aspects of the present disclosure involve transmitting frames based on a restricted target wakeup time service period (TWT SP) and a buffer status frame within the TWT SP, with one or more further processing conditions. For example, in communications involving a multi-link device (MLD) that does not have capabilities of transmitting while receiving, a transmission opportunity (TXOP) holder may be set to end at the beginning of the TWT SP. In communications in which the TWT SP may be protected by a quiet element, the duration of the quiet element may be set to be less than a duration of the TWT SP. For MLDs having enhanced multi-link multi-radio (eMLSR) or enhanced multi-link multi-radio (eMLMR), a first communication frame restriction may be set outside of the TWT SP for a single link.

Another embodiment is directed to a specific method as follows. A restricted TWT SP is negotiated for communications traffic between first and second wireless circuits, and the first wireless circuit polls a buffer status of the negotiated traffic using a BSRP trigger frame of the second wireless circuit within the restricted TWT SP. The second wireless circuit reports the buffer status of the negotiated traffic in response to a polling frame from the first wireless circuit. Frames corresponding to the negotiated communications traffic are transmitted between the first and second wireless circuits, within the restricted TWT SP. Where the first or second wireless circuits operate as a TXOP holder in a first link, a TXOP is terminated (e.g., set to end) at the beginning of a restricted TWT SP of a second link. In response to the restricted TWT SP being protected by a quiet element specifying a protected duration period during which transmissions are not to occur, the protected duration is set to a time that is less than a duration of the restricted TWT SP. In response to the second wireless circuit providing eMLSR operation, a restricted TWT SP for a first frame exchange in a TXOP outside of the restricted TWT SP is negotiated in a single link.

In a more specific example embodiment, frames are transmitted in response to a restricted TWT SP for communications traffic between a first wireless circuit and a second wireless circuit and to a buffer status of the communications traffic conveyed via a BSRP trigger frame within the restricted TWT SP, corresponding to the communications traffic between the first wireless circuit and the second wireless circuit within the restricted TWT SP. Control data for the communications traffic (e.g., data corresponding to the wirelessly communicated signals) is processed in response to the restricted TWT SP as follows. A TXOP may be terminated at the beginning of a restricted TWT SP of a another link, in response to the restricted TWT SP being negotiated in a first link among multiple links between the first wireless circuit and the second wireless circuit and in response to the second wireless circuit not having STR configuration. Alternatively or in conjunction with the aforementioned TXOP termination/utilization, a protected duration time for the TWT SP may be set to a time that is less than a duration of the TWT SP in response to the TWT SP being protected by a quiet element duration period. As another alternate and/or combination with one or both of the aforementioned TXOP termination and quiet element-based operation, control data for the communications traffic may be processed by applying a TWT SP of a first frame exchange in a TXOP outside of the restricted TWT SP that is negotiated in a single link, in response to the second wireless circuit providing eMLSR or eMLMR operation, processing.

Certain embodiments are directed to a wireless communications circuit including communications circuitry to wirelessly communicate signals and processing circuitry that is configured with the communications circuitry to carry out the following operations. In response to a restricted TWT SP for communications traffic with another wireless communications circuit and to a buffer status of the communications traffic conveyed via a BSRP trigger frame within the restricted TWT SP, frames corresponding to the communications traffic and within the restricted TWT SP are transmitted. Control data for the communications traffic is processed in response to the restricted TWT SP by terminating a TXOP at the beginning of a restricted TWT SP of a another link, in response to the restricted TWT SP being negotiated in a first link among multiple links between the wireless communications circuits and in response to the second wireless circuit not having transmitting while receiving (STR) configuration. In connection with or as an alternate to the aforementioned response to the restricted TWT SP and buffer status, a protected duration time for the TWT SP may be set to a time that is less than a duration of the TWT SP in response to the TWT SP being protected by a quiet element duration period. In further connection with (or as an alternate to) the aforementioned responses, the processing circuitry may operate with the communications circuitry to, in response to the other wireless communications circuit providing eMLSR or eMLMR operation, process control data for the communications traffic by applying a TWT SP of a first frame exchange in a TXOP outside of the restricted TWT SP that is negotiated in a single link. In certain implementations, the processing circuitry is configured with the communications circuitry to operate as a TXOP holder in a second link, and to terminate a TXOP of the second link at the beginning of the restricted TWT SP of the first link.

The above discussion/summary is not intended to describe each embodiment or every implementation of the present

BRIEF DESCRIPTION OF FIGURES

Various example embodiments may be more completely understood in consideration of the following detailed description in connection with the accompanying drawings, in which.

Figure 1:
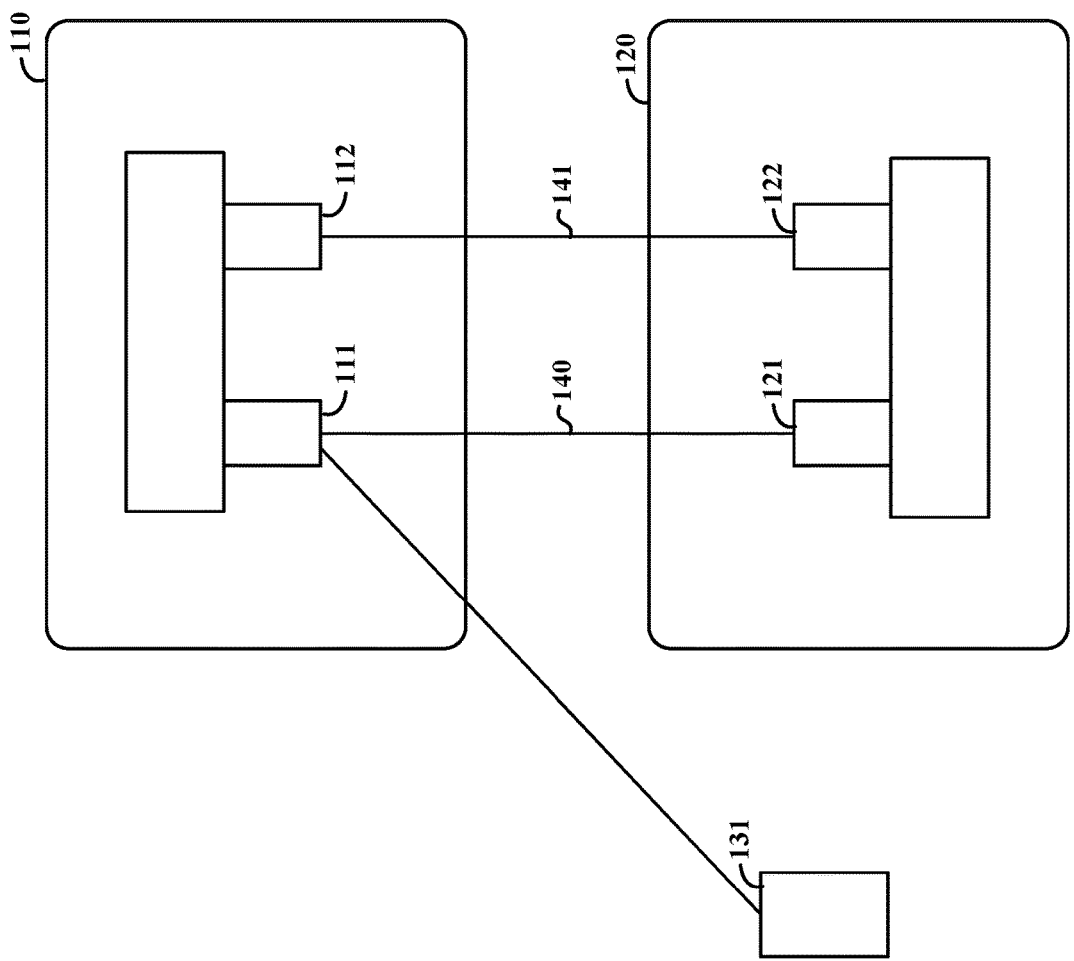
FIG. 1 shows a system for multi-link communications, as may be implemented in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving wireless communications, such as communications between devices utilizing multiple links and in environments in which certain devices utilize a single communication link. Such devices may or may not exhibit capabilities of transmitting while receiving. In certain implementations, aspects of the present disclosure have been shown to be beneficial when used in the context of communicating between wireless devices in accordance with a protocol involving a TWT SP. Various embodiments involve negotiating usage of communication links shared amongst two or more devices in this regard. While not necessarily so limited, various aspects may be appreciated through the following discussion of non-limiting examples which use exemplary contexts.

Various embodiments are characterized in the underlying provisional applications to which priority is claimed, which are noted as follows and fully incorporated herein by reference:

U.S. Provisional Patent Application No. 63/086,166, filed on Oct. 1, 2020;

U.S. Provisional Patent Application No. 63/140,765 filed on Jan. 22, 2021; and

U.S. Provisional Patent Application No. 63/160,449 filed on Mar. 12, 2021.

For example, referring to U.S. Provisional Patent Application No. 63/086,166, various embodiments may be directed toward aspects therein including those characterized as utilizing frame transmission for NS, EP and QoS support with use of restricted TWT SPs or other periodic negotiated SPs. Various TWT characterizations and enhancements as depicted in U.S. Provisional Patent Application No. 63/140, 765 may be utilized in accordance with one or more embodiments, for instance as may be tailored to specific device types (e.g., eMLMR, eMLSR). With regard to Provisional Patent Application No. 63/160,449, aspects relating to the utilization of quiet elements as characterized therein may be implemented in accordance with one or more embodiments.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

As used herein, the following abbreviations may be implemented in accordance with the indicated explanation (some of which are also characterized above):

TWT—target wakeup time
SP—service period
TWT SP—target wakeup time service period
STA—station
EHT—extremely high throughput
AP—access point
CF-end—contention-free end
NSEP—national security & emergency preparedness
BSRP—buffer status report poll
BSS—basic service set
TXOP—transmission opportunity
PPDU—physical layer convergence procedure protocol data unit
TC—traffic class
TB—trigger based
TID—traffic identifier
UL—uplink
MLD—multi-link device
STR—simultaneous transmitting while receiving capability
NSTR—non-simultaneous transmitting while receiving
MLSR—multi link single radio
eMLSR—enhanced MLSR
MLMR—multi-link multi-radio
eMLMR—enhanced multi-link multi-radio
EDCA—enhanced distributed channel access
MU EDCA—multi-user EDCA
QE—quiet element as may define an interval during which no transmission should occur
in the current channel
QoS—quality of service
AC—access category
TXOP Holder—device that has successfully contented the medium for data transmission Various embodiments may utilize restricted TWT SPs, as may be referred to as restricted TWT agreements. For instance, an EHT AP may announce a restricted TWT agreement for TC that requires NSEP or guaranteed low latency QoS service. Guaranteed resources may be allocated to NSEP or guaranteed QoS. An EHT STA within the BSS may end its TXOP before the start of the restricted SP(s). Further, broadcast TWTs can be used for a restricted TWT. Frame transmission in a restricted TWT SP may be restricted, e.g., for specific negotiated TIDs (TCs).

A variety of TB PPDU transmission rules may be used in accordance with one or more embodiments. An AP may indicate a preferred AC in a basic trigger frame for solicited STAs by the basic trigger frame. The solicited STAs may decide the TID whose frames are to be transmitted in the solicited TB PPDU. In one embodiment, a solicited STA may select transmitted frames with TID(s) matched to a preferred AC instead of any TID. A solicited STA may select transmitted frames with TID(s) having a higher priority than the preferred AC, and/or may select transmitted frames with TID(s) having a lower priority than the preferred AC. Frame selection rules for TB PPDU may be restricted. After the frames of the high-priority TIDs are all transmitted, if there is still remaining room in the TB PPDU, the frames from low priority TIDs can be transmitted in the solicited TB PPDU.

In some embodiments, an AP polls a STA's buffer status in a restricted TWT SP through a trigger frame (e.g., EHT BSRP Trigger), and the STA may at least (or only) report the buffer status of the TIDs that are negotiated for the restricted TWT SP. The solicited STA may decide the reported TIDs based on whether the EHT BSRP Trigger is received in restricted TWT SP. In some implementations, the AP indicates the solicited TIDs in the EHT BSRP trigger for a restricted TWT SP. In other implementations, the AP indicates the EHT BSRP trigger as the buffer status solicitation for a restricted TWT SP.

When the negotiated traffic for the restricted TWT SP shares the same TID with other traffic, a solicited STA may report the buffer status for the traffic negotiated for the restricted TWT SP. In some implementations, the size of the buffered frames with the same TID as the negotiated traffic but not belonging to the negotiated traffic are not be reported as combined with negotiated traffic. In some embodiment, the solicited STA may indicate the TID whose buffer status is reported explicitly. Within a restricted TWT SP, solicited STAs may report the correct buffer status for the negotiated traffic for the restricted TWT SP. When the traffic for the restricted TWT SP shares the same TID with other traffic, a solicited STA may report the buffer status for the traffic negotiated for the restricted TWT SP. A solicited STA may be restricted from reporting the buffered frame size more than the real buffered frames of the negotiated TID (negotiated traffic) for the restricted TWT SP. When the AP allocates enough resources (e.g., the combination of UP TB PPDU length, RU size, MCS) in an EHT basic trigger frame for the reported buffer size of the TID that is negotiated for the restricted TWT SP, the STA may transmit the buffered frames of the negotiated TID (negotiated traffic) without wasting the allocated resource in TB PPDU.

An STA's frame transmission in a TB PPDU with a restricted TWT SP may be carried out as follows. An AP may indicate a preferred AC in a basic trigger frame based on the negotiated traffic (TID) of the restricted TWT SP. The AP may operate such that the resource (e.g., the combination of UP TB PPDU length, RU size, MCS) is not allocated more than the reported buffer status for the negotiated TID/traffic, for all solicited STAs. The allocated resource for a solicited STA can be more than requested, for instance in consideration of a common UL TB PPDU length for all solicited STAs.

A solicited STA may transmit the frames of the negotiated traffic (TID) of the restricted TWT SP in the TB PPDU in the restricted TWT SP. When the negotiated traffic for the restricted TWT SP shares the same TID with other traffic, a solicited STA may transmit the frames of the negotiated traffic of the restricted TWT SP in the TB PPDU. If there is unused time in UL TB PPDU, a solicited STA may transmit frames with TID that is not negotiated for the restricted TWT SP. When the negotiated traffic for the restricted TWT SP shares the same TID with other traffic, and when there is unused time in UL TB PPDU, a solicited STA may transmit frames from traffic/TID that is not negotiated for the restricted TWT SP.

When a STA uses EDCA to transmit its frames in its restricted TWT SP, the STA may transmit its frames the negotiated traffic (TID) of the restricted TWT SP in the restricted TWT SP. When the negotiated traffic for the restricted TWT SP shares the same TID with other traffic, a solicited STA may transmit frames of the negotiated traffic of the restricted TWT SP after its backoff counter becomes 0.

The restricted TWT agreement (SP) may be implemented for different traffic, for instance as part of a broadcast TWT agreement. An AP may announce the restricted TWT agreements with various TWT wake intervals and TWT wake durations in beacon frames. Certain traffic may not need to be serviced in each SP of a broadcast restricted TWT agreement. A STA can negotiate its restricted TWT agreement with the specific start time and the wake interval, with the start time corresponding to the start time of a broadcast TWT SP. The interval may be one or multiples of a TWT wake interval of a broadcast restricted TWT agreement. In some implementations, MU EDCA parameters specific for a restricted TWT SP are announced in order to avoid frame transmission for traffic other than the negotiated traffic for the restricted TWT SP in the TWT SP.

In certain embodiments in which an AP MLD and an eMLSR STA MLD (e.g., ESR STA MLD=ESR non-AP MLD) negotiate a restricted TWT SP in one link (link1), the AP MLD (the AP of the AP MLD in link2) as the TXOP holder is set so that it does not overlap its TXOP with the restricted SP in the time domain in another link (link2), or to end its TXOP before the start of the restricted SP in another link (link2) where the following are true:

the ESR STA MLD (the STA of the ESR STA MLD in link2) is the TXOP responder in the TXOP; and link1 and link2 are a pair of links where ESR STA MLD works in ESR mode.

When an AP MLD and an eMLSR STA MLD (e.g., ESR STA MLD=ESR non-AP MLD) negotiate a restricted TWT SP in one link (link1), the AP MLD (the AP of the AP MLD in link2) as the TXOP holder may be set so that it does not overlap its TXOP with the restricted SP in the time domain in another link (link2), or to end its TXOP before the start of the restricted SP in another link (link2) where the following are true:

the ESR STA MLD (the STA of the ESR STA MLD in link2) is the TXOP responder in the TXOP;

link1 and link2 are a pair of links where ESR STA MLD works in ESR mode; and the TIDs of the low latency traffic negotiated for restricted TWT is not mapped to link2.

When an AP MLD and an eMLSR STA MLD negotiate a restricted TWT SP in one link (link1), the ESR STA MLD (the STA of the STA MLD in link2) as the TXOP holder is set such that it does not overlap its TXOP with the restricted SP in time domain in another link (link2), or such that it ends its TXOP before the start of the restricted SP in another link (link2) where the following are true:

the AP MLD (the AP of the AP MLD in link2) is the TXOP responder in the TXOP; and link1 and link2 are a pair of links where ESR STA MLD works in ESR mode.

When an AP MLD and an eMLSR STA MLD negotiate a restricted TWT SP in one link (link1), the ESR STA MLD (the STA of the STA MLD in link2) as the TXOP holder may be set such that it does not overlap its TXOP with the restricted SP in time domain in another link (link2), or such that it ends its TXOP before the start of the restricted SP in another link (link2) where the following are true:

the AP MLD (the AP of the AP MLD in link2) is the TXOP responder in the TXOP;

link1 and link2 are a pair of links where ESR STA MLD works in ESR mode; and the TIDs of the low latency traffic negotiated for restricted TWT is not mapped to link2.

When an AP MLD and an eMLMR NSTR STA MLD (e.g., EMR STA MLD=EMR non-AP MLD) negotiate a restricted TWT SP in one link (link1), the AP MLD (the AP of the AP MLD in link2) as the TXOP holder may be set such that it does not overlap its TXOP with the restricted SP in time domain in another link (link2), or such that it ends its TXOP before the start of the restricted SP in another link (link2), where the following are true:

the EMR STA MLD (the STA of the EMR STA MLD in link2) is the TXOP responder in the TXOP; and link1 and link2 are a pair of links where the EMR STA MLD works in EMR mode within the restricted TWT SP.

When an AP MLD and an eMLMR NSTR STA MLD (e.g., EMR STA MLD=EMR non-AP MLD) negotiate a restricted TWT SP in one link (link1), the AP MLD (the AP of the AP MLD in link2) as the TXOP holder may be set such that it does not overlap its TXOP with the restricted SP in time domain in another link (link2), or such that it ends its TXOP before the start of the restricted SP in another link (link2), where the following are true:

the EMR STA MLD (the STA of the EMR STA MLD in link2) is the TXOP responder in the TXOP;

link1 and link2 are a pair of links where the EMR STA MLD works in EMR mode within the restricted TWT SP; and the TIDs of the low latency traffic negotiated for restricted TWT is not mapped to link2.

When an AP MLD and an eMLMR NSTR STA MLD (e.g., EMR STA MLD) negotiate a restricted TWT SP in one link (link1), the ESR STA MLD (the STA of the STA MLD in link2) as the TXOP holder may be set such that it does not overlap its TXOP with the restricted SP in time domain in another link (link2), or such that it ends its TXOP before the start of the restricted SP in another link (link2) where the following are true:

the AP MLD (the AP of the AP MLD in link2) is the TXOP responder in the TXOP; and link1 and link2 are a pair of links where the EMR STA MLD works in EMR mode within the restricted TWT SP.

When an AP MLD and an eMLMR NSTR STA MLD (e.g., EMR STA MLD) negotiate a restricted TWT SP in one link (link1), the ESR STA MLD (the STA of the STA MLD in link2) as the TXOP holder is set such that it does not overlap its TXOP with the restricted SP in time domain in another link (link2), or such that it ends its TXOP before the start of the restricted SP in another link (link2) where the following are true:

the AP MLD (the AP of the AP MLD in link2) is the TXOP responder in the TXOP;

link1 and link2 are a pair of links where the EMR STA MLD works in EMR mode within the restricted TWT SP; and the TIDs of the low latency traffic negotiated for restricted TWT is not mapped to link2.

When an AP MLD and a MLSR STA MLD (e.g., SR STA MLD=SR non-AP MLD) negotiate a restricted TWT SP in one link (link1), the AP MLD (the AP of the AP MLD in link2) as the TXOP holder may be set such that it does not overlap its TXOP with the restricted SP in time domain in another link (link2), or such that it ends its TXOP before the start of the restricted SP in another link (link2) where the SR STA MLD (the STA of the SR STA MLD in link2) is the TXOP responder in the TXOP.

When an AP MLD and a MLSR STA MLD (e.g., SR STA MLD=SR non-AP MLD) negotiate a restricted TWT SP in one link (link1), the AP MLD (the AP of the AP MLD in link2) as the TXOP holder may be set such that it does not overlap its TXOP with the restricted SP in time domain in another link (link2), or such that it ends its TXOP before the start of the restricted SP in another link (link2) where the SR STA MLD (the STA of the SR STA MLD in link2) is the TXOP responder in the TXOP and the TIDs of the low latency traffic negotiated for restricted TWT is not mapped to link2.

When an AP MLD and a MLSR STA MLD (e.g., SR STA MLD) negotiate a restricted TWT SP in one link (link1), the SR STA MLD (the STA of the SR STA MLD in link2) as the TXOP holder may be set such that it does not overlap its TXOP with the restricted SP in time domain in another link (link2), or such that it ends its TXOP before the start of the restricted SP in another link (link2), where the AP MLD (the AP of the AP MLD in link2) is the TXOP responder in the TXOP.

When an AP MLD and a MLSR STA MLD (e.g., SR STA MLD) negotiate a restricted TWT SP in one link (link1), the SR STA MLD (the STA of the SR STA MLD in link2) as the TXOP holder may be set such that it does not overlap its TXOP with the restricted SP in time domain in another link (link2), or such that it ends its TXOP before the start of the restricted SP in another link (link2), where the AP MLD (the AP of the AP MLD in link2) is the TXOP responder in the TXOP and the TIDs of the low latency traffic negotiated for restricted TWT is not mapped to link2.

When an AP MLD negotiates a restricted TWT SP with a MLMR NSTR STA MLD in one link (link1), the AP MLD (the AP of the AP MLD in link2) may be set such that it does not overlap its TXOP with the restricted SP in time domain in another link (link2), or such that its TXOP ends before the start of the restricted SP in another link (link2) where the following are true:

the NSTR STA MLD (the STA of the NSTR STA MLD in link2) is the TXOP responder in the TXOP; and link1 and link2 are a pair of links with NSTR capability at STA MLD.

When an AP MLD negotiates a restricted TWT SP with a MLMR NSTR STA MLD in one link (link1), the AP MLD (the AP of the AP MLD in link2) may be set such that it does not overlap its TXOP with the restricted SP in time domain in another link (link2), or such that its TXOP ends before the start of the restricted SP in another link (link2) where the following are true:

the NSTR STA MLD (the STA of the NSTR STA MLD in link2) is the TXOP responder in the TXOP;

link1 and link2 are a pair of links with NSTR capability at STA MLD; and the TIDs of the low latency traffic negotiated for restricted TWT is not mapped to link2.

When an AP MLD negotiates a restricted TWT SP with a NSTR STA MLD in one link (link1), the STA MLD (the STA of the STA MLD in link2) may be operated such that it does not overlap its TXOP with the restricted SP in time domain in another link (link2), or such that it ends its TXOP before the start of the restricted SP in another link (link2) where the following are true:

the NSTR STA MLD (the STA of the NSTR STA MLD in link2) is the TXOP initiator in the TXOP; and link1 and link2 are a pair of links with NSTR capability at STA MLD.

When an AP MLD negotiates a restricted TWT SP with a NSTR STA MLD in one link (link1), the STA MLD (the STA of the STA MLD in link2) may be operated such that it does not overlap its TXOP with the restricted SP in time domain in another link (link2), or such that it ends its TXOP before the start of the restricted SP in another link (link2) where the following are true:

the NSTR STA MLD (the STA of the NSTR STA MLD in link2) is the TXOP initiator in the TXOP;

link1 and link2 are a pair of links with NSTR capability at STA MLD; and the TIDs of the low latency traffic negotiated for restricted TWT is not mapped to link2.

A variety of embodiments are directed to TWT enhancement, for instance as may be used for low latency traffic and/or NSEP traffic. In this context, individual TWT and broadcast TWT may be defined, where such broadcast TWT agreements may be broadcast in beacons. A STA may negotiate the broadcast TWT agreements that it wants to join, and each STA may implicitly join a broadcast TWT agreement with broadcast TWT ID 0.

In a particular embodiment involving a broadcast TWT and TWT ID, a broadcast TWT SP for specific traffic, such as low latency traffic, or NSEP traffic, may utilize a broadcast TWT ID that is not equal to 1. STAs that don't support the specific traffic may not be scheduled within the TWT SP. A broadcast TWT SP utilizing opportunistic power save may be avoided for low latency traffic or NSEP traffic.

TWT may be used with eMLSR/eMLMR STA MLDs in a variety of manners. For instance, an eMLSR/eMLMR STA MLD may negotiates TWT SPs in all its links for eMLSR/eMLMR operation where the TWT SPs in these links have same start time, SP interval and SP duration. When an AP MLD uses one of its links for specific traffic (e.g., low latency traffic, or NSEP traffic), an eMLSR/eMLMR STA MLD may negotiate the TWT SPs in the link for the specific traffic. Within the TWT SPs, the eMLSR/eMLMR STA MLD may work temporarily in MLSR/MLMR mode respectively. At the beginning of the TWT SP, the eMLSR/eMLMR STA MLD switches to MLMSR/MLMR mode without explicit mode switching indication. At the end of the TWT SP, the eMLSR/eMLMR STA MLD switches back to eMLSR/eMLMR mode without explicit mode switching indication. In some implementations, within the TWT SPs the eMLSR/eMLMR STA MLD works in eMLSR/eMLMR mode respectively with the eMLSR/eMLMR STA MLD working in one link, where the restriction of first frame exchange for eMLSR/eMLMR mode (e.g., the restrictions of data rate, MCS, frame type, PPDU type of the first frame exchange of a TXOP) is not applied.

A variety of types of Broadcast TWT Agreements may be utilized in accordance with various embodiments. When a broadcast TWT agreement for a specific traffic (service) type (e.g. low latency, or NSEP) announced in the Beacons doesn't indicate the traffic type, a STA that doesn't support the type may try to join the TWT. In order to avoid this, a broadcast TWT agreement for a specific traffic (service) type announced in the Beacons may announce the supported traffic type. A broadcast TWT recommendation field can be used for such indication. If a specific traffic type is announced for a broadcast TWT agreement and an EHT STA doesn't support the traffic type, the EHT STA is not allowed to try to join the TWT. The specific types of broadcast TWT agreements may be carried in a separate element, other than TWT elements. The element may include the pairs of broadcast TWT ID and broadcast TWT agreement type.

Individual TWT Agreements may be announced in a variety of manners. An AP may announce its established individual TWT agreements to let other STAs follow to establish the individual TWT agreements. The announcement can be in a new defined element to announce the start time, TWT interval, TWT SP duration and the traffic/service type of the agreement (e.g., low latency support, NSEP support).

Various embodiments are directed to utilizing a quiet element for low latency service support, for which a restricted TWT SP may be used. An EHT STA that supports low latency service stops its TXOP at the beginning of a restricted TWT SP. An EHT AP may announce a quiet element that overlaps with TWT SP. An EHT STA may ignore the quiet element if it defines quiet intervals that overlap with restricted TWT SPs.

Certain implementations are directed toward facilitating the utilization of a quiet element in a legacy station, for example a station using a single link. A restricted TWT SP can be set to a longer length than the required time of low latency traffic. In some implementations, an EHT AP may release the remaining time of the restricted TWT SP by sending a CF-end if the following conditions are true:

the restricted TWT SP is longer than the required time of the low latency traffic; and the Duration in MAC header or TXOP in PHY header covers the whole TWT SP.

If a quiet interval is overlapped with the whole TWT SP, legacy STAs may not be able to use the released time of the TWT SP. However an EHT STA can use the released TWT SP for their frame transmission.

In some implementations, the quiet interval of a quiet element (with a duration defined by a quiet duration) used to protect the restricted TWT SP has a short quiet duration, i.e., 1 TU. With this restriction, after one TU, legacy STAs can access the medium if the AP doesn't use the remaining time of a restricted TWT SP for the low latency traffic. Additional restrictions may be applied to the quiet interval for protecting a restricted TWT SP, for instance by setting the start time of a quiet duration (as may be defined by a quiet offset) to the same time as the start time of the protected restricted TWT SP.

When an AP uses the quiet intervals for protecting the restricted TWT SPs, the AP may announce the different EDCA parameters for legacy STAs and EHT STAs. A new element may be used to announce the EDCA parameter set for EHT STAs (EHT EDCA parameter set element). The EHT EDCA parameter set element may have same format as EDCA parameter set element.

An AP may use CF end to release the remaining time of a restricted TWT SP if the following conditions are true:

the AP uses the quiet intervals for protecting the restricted TWT SPs; and the AP uses part of restricted TWT SP for low latency traffic.

The remaining time may be used for other traffic by AP and STAs.

Another approach is carried out such that an AP uses CF end to release the remaining time of a restricted TWT SP if the following conditions are true:

the AP uses the quiet intervals for protecting the restricted TWT SPs;

the used time for low latency traffic in less than the quiet interval defined by a quiet element; and the AP uses part of restricted TWT SP for low latency traffic.

The remaining time is used for other traffic by AP and STAs.

Quiet intervals may be used for a variety of purposes. For instance, if a quiet interval is not used for protecting a restricted TWT SP, the EHT STA may not ignore the quiet interval. A quiet interval not used for protecting the restricted TWT SP may be identified and/or implemented as follows:

if a quiet interval doesn't overlap with any restricted TWT SP, the quiet interval is not used to protect the restricted TWT SP;

if the start time of quiet interval is not same as any of restricted TWT SP, the quiet interval is not used to protect the restricted TWT SP; and if the start time of quiet interval is the same as a restricted TWT SP but the duration of the quiet interval is longer than the restricted TWT SP, the quiet interval is not used to protect the restricted TWT SP.

A restricted TWT SP may indicate whether it is protected by a quiet element. For instance, the related element may carry the indication, such as if the TWT element for broadcast TWT is used to define restricted TWT SP, in which the TWT element carries such indication (for example by using a reserved field in a control field). If a restricted TWT SP indicates no protection through quiet element, and a quiet interval overlaps with the restricted TWT SP, the quiet interval is not used to protect the restricted TWT SP.

In accordance with a particular embodiment, frames are transmitted between first and second wireless circuits in response to/based on a restricted TWT SP and a buffer status as may be conveyed via a BSRP trigger frame within the restricted TWT SP. The BSRP trigger frame may indicate a solicited traffic identifier (TID), and the buffer status may indicate the buffer status of the solicited TID. Control data for the communications traffic (e.g., relating to the wireless communications and/or a corresponding protocol) may be processed in response to the restricted TWT SP as follows. When the second wireless circuit does not have STR configuration, a TXOP for a first link (e.g., among multiple links between the first and second wireless circuits) may be terminated (e.g., set to end) at the beginning of a restricted TWT SP of another link in response to the restricted TWT SP being negotiated in the first link. For instance, the second wireless circuit may exhibit device characteristics selected from the group consisting of: multi link single radio (MLSR) MLD, enhanced MLSR (eMLSR) MLD, enhanced multi-link multi-radio (eMLMR) MLD, and no transmitting while receiving (NSTR) MLD. Where the first or second wireless circuits operate as a TXOP holder in a second link, the TXOP of the second link may be terminated/set to end at the beginning of the restricted TWT SP of the first link.

Alternatively or in conjunction with the aforementioned TXOP termination and/or utilization, a protected duration time for the TWT SP may be set to a time that is less than a duration of the TWT SP when the TWT SP is protected by a quiet element duration period (e.g., a protected duration period during which transmissions are not to occur). As another alternate and/or combination with one or both of the aforementioned TXOP termination and quiet element-based operation, control data for the communications traffic may be processed by applying a TWT SP of a first frame exchange in a TXOP outside of the restricted TWT SP that is negotiated in a single link when the second wireless circuit is an eMLSR or eMLMR MLD.

In some instances, higher priority communication may be provided to a particular data traffic class and NSEP service. For example, the restricted TWT SP may be negotiated, the buffer status of the negotiated traffic may be polled using a buffer status report poll (BSRP) Trigger frame, of the second wireless circuit within the restricted TWT SP. The second wireless circuit may report buffer size information of the communications traffic in response to a solicited trigger frame having an explicit indication or in response to the second wireless circuit receiving the solicited trigger frame within the restricted TWT SP. The first wireless circuit may indicate, within the restricted TWT SP, a preferred access class (AC) or traffic identifier (TID) in a trigger that the negotiated traffic NSEP belongs to, in response to the first wireless circuit being configured to not allocate a resource more than a reported buffer status for the TID of the negotiated traffic for solicited second devices.

As another example involving higher priority communication provided to a particular data traffic class and NSEP service where the first wireless circuit is an access point (AP) MLD and the second wireless circuit is an eMLSR station (STA) MLD, the AP MLD and eMLSR STA MLD may negotiate a restricted TWT SP in the first link, with the AP MLD as the TXOP holder and setting its TXOP to avoid overlap with the restricted TWT SP in the time domain in the other link. This can be carried out in response to the eMLSR STA MLD being a TXOP responder in the TXOP, and the links being a pair of links with the eMLSR STA MLD operating in eMLSR mode within the restricted TWT SP.

A further example involving higher priority communication provided to a particular data traffic class and NSEP service is carried out as follows when the first wireless circuit is an AP MLD and the second wireless circuit is an eMLMR STA MLD. For a restricted TWT SP negotiated by the AP MLD and eMLMR STA MLD in the first link, the AP MLD is operated as the TXOP holder while preventing its TXOP from overlapping with a restricted TWT SP in the time domain in the second link in response to the eMLMR STA MLD being the TXOP responder in the TXOP, and the first and second link being a pair of links where eMLMR STA MLD works in eMLMR mode within the restricted TWT SP. For a restricted TWT SP negotiated by the AP MLD and eMLMR STA MLD in the first link, the AP MLD operates as the TXOP holder while preventing its TXOP from overlapping with a restricted TWT SP in the time domain in the second link in response to the AP MLD being the TXOP responder in the TXOP and the first and second link being a pair of links where eMLMR STA MLD works in eMLMR mode within the restricted TWT SP.

In certain implementations, the first wireless circuit announces individual/broadcast restricted TWT SP agreements that are already established, with the frames being transmitted by joining and using one of the announced restricted TWT SP agreements via the second wireless circuit. The first wireless circuit may further announce a traffic/service type that respective ones of restricted TWT SP support, wherein transmitting the frames includes selecting and using one of the restricted TWT SPs based on the traffic/service type that it supports, via the second wireless circuit.

Higher priority may be provided to a traffic class for the communications between the first wireless circuit and the second wireless circuit as follows. The first wireless circuit may announce whether it provides priority to service to one or more traffic classes, and the second wireless circuit may announce whether it requests one or more traffic classes. A higher priority is assigned to frames of a particular traffic class. The first wireless circuit accepts a TWT SP request for the particular class from the second wireless circuit when the network is congested, and the accepted TWT SP request is protected from the third devices utilizing a quiet element. A quiet period duration may be defined using a quiet element having a start time that is the same as a start time of the restricted TWT SP and having a duration minimum value corresponding to a duration of the restricted TWT SP (e.g., the period is at least as long as the protected TWT SP, ensuring restricted access for the TWT SP).

Various embodiments are directed to circuit-based implementations of the aforementioned operations/functions, as may utilize wireless communications circuitry and related processing circuitry. FIG. 1 characterizes such an apparatus, as may further implement the operations/processes depicted in the other figures.

More specifically, FIG. 1 shows a system 100 involving multi-link communications, as may be implemented in accordance with one or more aspects of the disclosure. MLD 110 is shown including respective communication circuits 111 and 112 for communicating on respective links, and another MLD 120 is shown having respective communication circuits 121 and 122 for respectively communicating with communication circuits 111 and 112 as shown. A single-link communication circuit 131 is also shown, which may be implemented with the system 100. The communication circuits may, for example, include one or more transmitters, receivers, transceivers and/or other wireless communication circuitry such as an antenna or antennas, and circuitry for wireless signal generation.

The system 100 operates in accordance with one or more embodiments herein, in which communications over links 140 and 141 are managed based on capabilities of the MLD 110 and MLD 120 relative to transmission and reception Such aspects may, for example, be implemented in accordance with the approaches depicted in and described in connection with FIGS. 2-3.

Certain embodiments are directed to the MLD 110, other embodiments are directed to the MLD 120, and still other embodiments are directed to the system 100 as including both MLD 110 and MLD 120. For instance, MLD 110 may be implemented with circuits 111 and 112 operating as access points (e.g., for transmitting and receiving wireless signals). MLD 120 may be implemented with circuits 121 and 122 as wireless communication stations for communicating with the respective access points. When utilized, the communication circuit 131 may be operated as a station with single-channel communication capabilities.

Figure 2:
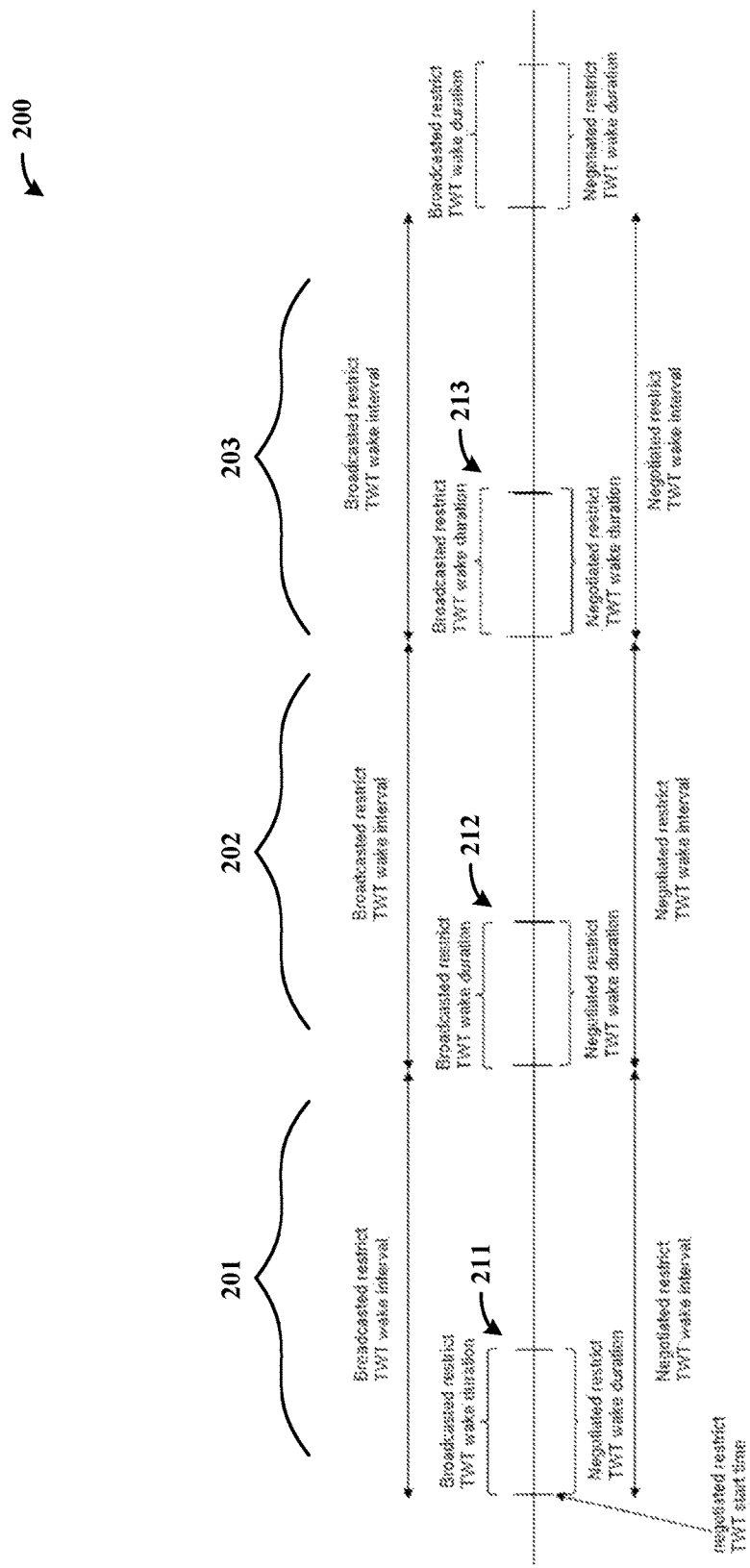
FIG. 2 is a diagram for communicating messages, in accordance with the present disclosure.

FIG. 2 shows a diagram 200 for communicating messages, in accordance with the present disclosure. Regions 201, 202 and 203 correspond to respective broadcast restricted TWT wake intervals and related negotiated restricted wake intervals. Within each interval, Broadcast and negotiated TWT wake durations are depicted at 211, 212 and 213, with TWT wake duration 211 beginning at a negotiated restricted TWT start time as shown.

As may be implemented with FIG. 2, an AP may announce the restricted TWT agreements with various TWT wake intervals and TWT wake durations in beacon frames. Certain traffic may not need to be serviced in each SP of a broadcast restricted TWT agreement. A STA can negotiate its restricted TWT agreement with the specific start time and the wake interval, with the start time corresponding to the start time of a broadcast TWT SP. The interval may be one or multiples of a TWT wake interval of a broadcast restricted TWT agreement.

Figure 3:
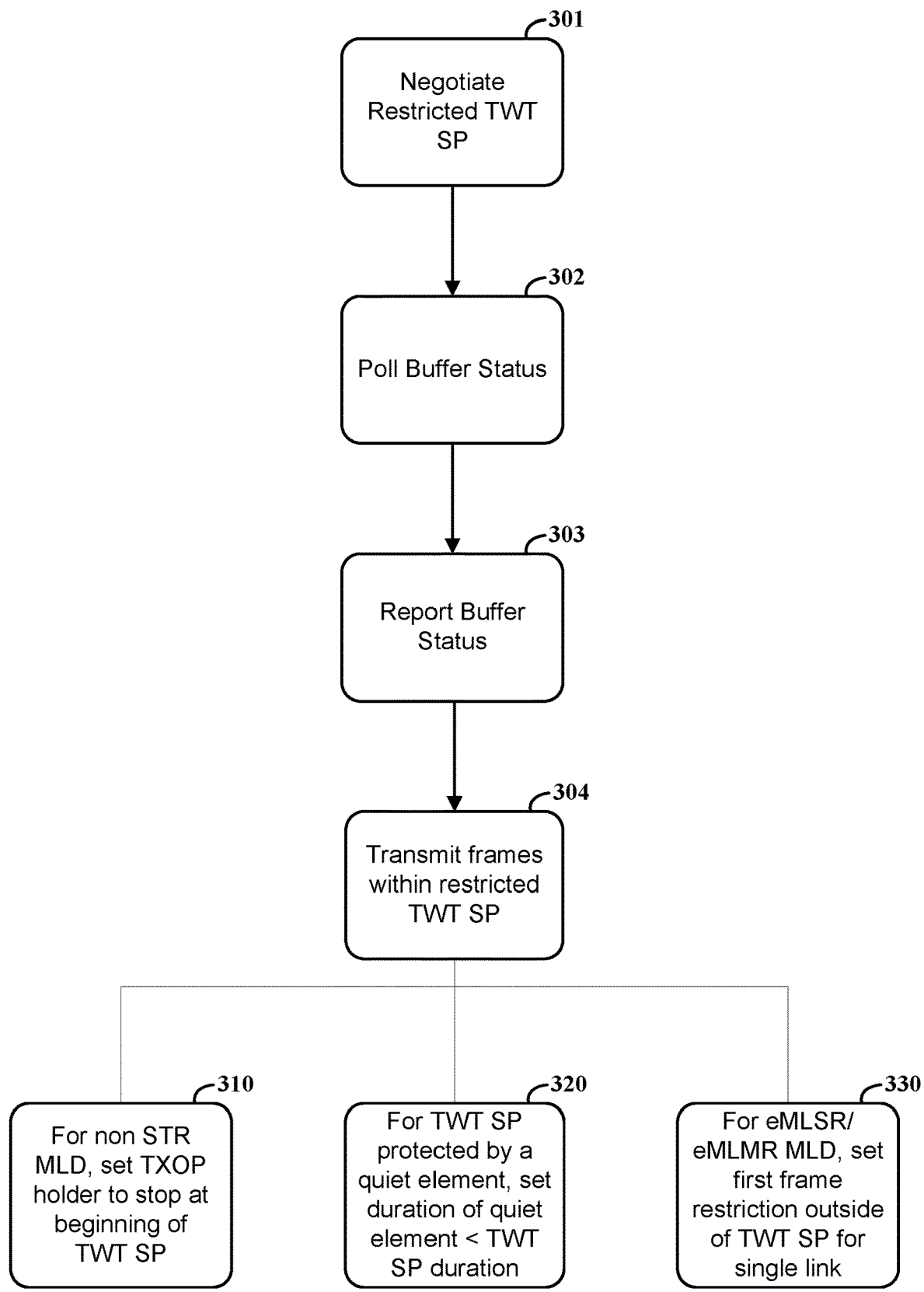
FIG. 3 is a flow diagram for communicating messages in accordance with one or more conditions, in accordance with the present disclosure.

FIG. 3 shows a flow diagram for communicating messages, in accordance with the present disclosure. At block 301, a restricted TWT SP is negotiated for communications links, buffer status is polled at block 302, and the polled buffer status is reported at block 303. Frames may then be transmitted within the restricted TWT SP at block 304.

In connection with these aspects, one or more of the operations/conditions depicted in blocks 310, 320 and 330 may be carried out in connection with the frame transmission at block 304. At block 310, communications involving a multi-link device MLD that does not have capabilities of transmitting while receiving (a non-STR MLD), a TXOP holder may be set to end at the beginning of the TWT SP. At block 320, communications in which the TWT SP is protected by a quiet element are effected by setting the duration of the quiet element to a value that is less than a duration of the TWT SP. At block 330, communications involving MLDs having eMLSR or eMLMR utilize a first communication frame restriction set outside of the TWT SP for a single link. The restriction may be set by allowed frame type, PPDU type, data rate and/or additional delay. Accordingly, the process noted at blocks 301-304 may be carried out using one or more of blocks 310, 320 and 330.

As examples, the Specification describes and/or illustrates aspects useful for implementing the claimed disclosure by way of various circuits or circuitry which may be illustrated as or using terms such as blocks, modules, device, system, unit, controller, station, MLD and/or other circuit-type depictions (e.g., reference numerals 110 and 120 of FIG. 1 depict a block/module as described herein). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing communications in accordance with one or more embodiments herein. For instance, TXOPs may be set based on TWT-SPs. A another process or method in this context may be recognized in connection with the functions/activities associated with blocks 301-304, and one or more of blocks 310, 320 and 330, as depicted in FIG. 3.

In certain of the above-discussed embodiments, one or more modules are discrete logic circuits or programmable logic circuits configured and arranged for implementing these operations/activities, as may be carried out in the approaches shown in FIGS. 1-3. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein (e.g., in connection with FIG. 3) is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Where the Specification may make reference to a "first wireless circuit" and a "second wireless circuit", etc., where the circuit might be replaced with terms such as a multi-link device or communications station, the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to process control data" is interpreted as "circuit configured to process control data").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, additional MLDs as depicted in FIG. 1 may be utilized together. As another example, certain embodiments are directed to a single MLD and/or a subset of circuitry within such an MLD and being operable in accordance with one or more embodiments herein. Such modifications do not depart from the true spirit and scope of various aspects of the disclosure, including aspects set forth in the claims.

What is claimed is:

1. A method comprising:
transmitting frames, in response to detecting a restricted target wakeup time service period (restricted TWT SP) for communications traffic between a first wireless circuit and a second wireless circuit and determining a buffer status of the communications traffic conveyed via a buffer status report poll (BSRP) trigger frame within the restricted TWT SP, corresponding to the communications traffic between the first wireless circuit and the second wireless circuit within the restricted TWT SP; and
processing control data for the communications traffic in response to detecting the restricted TWT SP by:
terminating a transmission opportunity (TXOP) at the beginning of a restricted TWT SP of a second link among multiple links between the first wireless circuit and the second wireless circuit, in response to the restricted TWT SP being negotiated in a first link among the multiple links between the first wireless circuit and the second wireless circuit and in response to the second wireless circuit not having transmitting while receiving (STR) configuration, and/or
setting a protected duration time for the TWT SP to a time that is less than a duration of the TWT SP in response to the TWT SP being protected by a quiet element duration period.

2. The method of claim 1, further including, in response to the second wireless circuit providing enhanced multi-link single-radio (eMLSR) or enhanced multi-link multi-radio (eMLMR) operation, processing control data for the communications traffic by applying a TWT SP of a first frame exchange in a TXOP outside of the restricted TWT SP that is negotiated in a single link.

3. The method of claim 1, wherein the first wireless circuit or the second wireless circuit is to operate as a TXOP holder in the second link, further including terminating a TXOP of the second link, at the beginning of the restricted TWT SP of the first link.

4. The method of claim 1, wherein the second wireless circuit exhibits device characteristics selected from the group consisting of: multi link single radio (MLSR) MLD, enhanced MLSR (eMLSR) MLD, enhanced multi-link multi-radio (eMLMR) MLD, and no transmitting while receiving (NSTR) MLD.

5. The method of claim 1, wherein the quiet element duration period refers to a protected duration period during which transmissions are not to occur.

6. The method of claim 1, wherein transmitting the frames and processing the control data include negotiating traffic for providing higher priority to a data traffic class and national security & emergency preparedness (NSEP) service between the first wireless circuit and the second wireless circuit.

7. The method of claim 6, including negotiating the restricted TWT SP, polling the buffer status of the negotiated traffic using a buffer status report poll (BSRP) Trigger frame, of the second wireless circuit within the restricted TWT SP.

8. The method of claim 6, including reporting, by the second wireless circuit, buffer size information of the communications traffic in response to a solicited trigger frame having an explicit indication or in response to the second wireless circuit receiving the solicited trigger frame within the restricted TWT SP.

9. The method of claim 6, further including indicating, within the restricted TWT SP, by the first wireless circuit an access class (AC) or traffic identifier (TID) in a trigger that the negotiated traffic NSEP belongs to in response to the first wireless circuit being configured to not allocate a resource more than a reported buffer status for the TID of the negotiated traffic for solicited second wireless circuits.

10. The method of claim 6, wherein the first wireless circuit is an access point (AP) multi-link device (MLD) and the second wireless circuit is an enhanced multi-link single-radio (eMLSR) station (STA) MLD, including using the AP MLD and eMLSR STA MLD to negotiate a restricted TWT SP in the first link, with the AP MLD as a holder of the TXOP and setting the TXOP of the AP MLD to avoid overlap with the restricted TWT SP in the time domain in the second link, in response to:
the eMLSR STA MLD being a TXOP responder in the TXOP; and
the links are a pair of links with the enhanced multi-link multi-radio (eMLSR) STA MLD operating in eMLSR mode within the restricted TWT SP.

11. The method of claim 6, wherein the first wireless circuit is an access point (AP) multi-link device (MLD) and the second wireless circuit is an enhanced multi-link multi-radio (eMLMR) station (STA) MLD, further comprising:
for a restricted TWT SP negotiated by the AP MLD and eMLMR STA MLD in the first link, operating the AP MLD as a TXOP holder while preventing the TXOP of the AP MLD from overlapping with a restricted TWT SP in the time domain in the second link in response to:
the eMLMR STA MLD being the TXOP responder in the TXOP; and
the first and second link being a pair of links where eMLMR STA MLD works in eMLMR mode within the restricted TWT SP; and
for a restricted TWT SP negotiated by the AP MLD and eMLMR STA MLD in the first link, for a restricted TWT SP negotiated by the AP MLD and eMLMR STA MLD in the first link, operating the AP MLD as the TXOP holder while preventing the TXOP of the AP MLD from overlapping with a restricted TWT SP in the time domain in the second link in response to:
the AP MLD being the TXOP responder in the TXOP; and the first and second link being a pair of links where eMLMR STA MLD works in eMLMR mode within the restricted TWT SP.

12. The method of claim 1, further including announcing, via the first wireless circuit, individual/broadcast restricted TWT SP agreements that are already established, wherein transmitting the frames includes joining and using one of the announced restricted TWT SP agreements via the second wireless circuit.

13. The method of claim 12 further including announcing, via the first wireless circuit, a traffic/service type that respective ones of restricted TWT SP support, wherein transmitting the frames includes selecting and using one of the restricted TWT SPs based on the traffic/service type that the one restricted TWT SP supports, via the second wireless circuit.

14. The method of claim 1, including providing higher priority to a traffic class of one or more traffic classes for the communications between the first wireless circuit and the second wireless circuit, by:
announcing, via the first wireless circuit, whether the first wireless circuit provides priority to service to the one or more traffic classes;
announcing, via the second wireless circuit, whether the second wireless circuit requests one or more traffic classes;
assigning a higher priority to frames of the traffic class;
accepting, via the first wireless circuit, a TWT SP request from the second wireless circuit that requests the traffic class in response to determining a network congestion; and
protecting the accepted TWT SP from third devices utilizing a quiet element.

15. The method of claim 14, further comprising defining a quiet period duration using a quiet element having a start time that is the same as a start time of the restricted TWT SP and having a duration minimum value corresponding to a duration of the restricted TWT SP.

16. The method of claim 1, wherein the BSRP trigger frame indicates a solicited traffic identifier (TID), and the buffer status indicates the buffer status of the solicited TID.

17. A method comprising:
negotiating a restricted target wakeup time service period (TWT SP) for communications traffic between a first wireless circuit and a second wireless circuit;
polling a buffer status of the communication traffic by the first wireless circuit using a buffer status report poll (BSRP) trigger frame of the second wireless circuit within the restricted TWT SP;
reporting the buffer status of the communications traffic by the second wireless circuit in response to receiving a polling frame from the first wireless circuit;
transmitting frames corresponding to the communications traffic between the first wireless circuit and the second wireless circuit within the restricted TWT SP;
terminating, in response to the first wireless circuit or the second wireless circuit operating as a TXOP holder in a first link among multiple links between the first wireless circuit and the second wireless circuit, a transmission opportunity (TXOP) at the beginning of a restricted TWT SP of a second link;
setting, in response to the restricted TWT SP being protected by a quiet element specifying a protected duration period during which transmissions are not to occur, the protected duration to a time that is less than a duration of the restricted TWT SP; and
applying, in response to the second wireless circuit providing enhanced multi-link single radio (eMLSR) operation, a restricted TWT SP of a first frame exchange in a TXOP outside of the restricted TWT SP that is negotiated in a single link among the multiple links between the first wireless circuit and the second wireless circuit.

18. A wireless communications circuit comprising:
communications circuitry to wirelessly communicate signals;
processing circuitry configured with the communications circuitry to:
transmit frames, in response to detecting a restricted target wakeup time service period (TWT SP) for communications traffic with another wireless communications circuit and determining a buffer status of the communications traffic conveyed via a buffer status report poll (BSRP) trigger frame within the restricted TWT SP, corresponding to the communications traffic and within the restricted TWT SP; and
process control data for the communications traffic in response to detecting the restricted TWT SP by:
terminating a transmission opportunity (TXOP) at the beginning of a restricted TWT SP of a second link among multiple links between the wireless communications circuit and the other wireless communication circuit, in response to the restricted TWT SP being negotiated in a first link among multiple links between the wireless communications circuit and the other wireless communication circuit and in response to one of the wireless communication circuit and other wireless communication circuit not having transmitting while receiving (STR) configuration, and/or
setting a protected duration time for the TWT SP to a time that is less than a duration of the TWT SP in response to the TWT SP being protected by a quiet element duration period.

19. The wireless communication circuit of claim 18, wherein the processing circuitry is further configured with the communications circuitry to, in response to the other wireless communications circuit providing eMLSR or eMLMR operation, process control data for the communications traffic by applying a TWT SP of a first frame exchange in a TXOP outside of the restricted TWT SP that is negotiated in a single link among the multiple links between the first wireless circuit and the other wireless communication circuit.

20. The wireless communication circuit of claim 18, wherein the processing circuitry is further configured with the communications circuitry to operate as a TXOP holder in the second link among the multiple links between the wireless communications circuit and the other wireless communication circuit, further including terminating the TXOP of the second link, at the beginning of the restricted TWT SP of the first link.

* * * * *